United States Patent
Kummer et al.

(10) Patent No.: US 8,074,501 B2
(45) Date of Patent: Dec. 13, 2011

(54) OPTICAL PRESSURE SENSOR HAVING AT LEAST TWO OPTICAL FIBERS

(75) Inventors: Adrian Kummer, Zurich (CH); Marco Gnielka, Winterthur (CH); Axel Bertholds, Verscio (CH)

(73) Assignee: Kistler Holding, AG, Winterthur (CH)

( * ) Notice: Subject to any disclaimer, the term of this patent is extended or adjusted under 35 U.S.C. 154(b) by 368 days.

(21) Appl. No.: 12/447,592

(22) PCT Filed: Nov. 26, 2007

(86) PCT No.: PCT/CH2007/000589
§ 371 (c)(1),
(2), (4) Date: Apr. 28, 2009

(87) PCT Pub. No.: WO2008/064506
PCT Pub. Date: Jun. 5, 2008

(65) Prior Publication Data
US 2010/0064785 A1    Mar. 18, 2010

(30) Foreign Application Priority Data
Nov. 27, 2006 (CH) .................................. 1914/06

(51) Int. Cl.
*G01M 15/00* (2006.01)
(52) U.S. Cl. ........................................ 73/114.19; 73/705
(58) Field of Classification Search ............ 73/114.16, 73/114.18, 114.19, 705, 715
See application file for complete search history.

(56) References Cited

U.S. PATENT DOCUMENTS

| | | | | |
|---|---|---|---|---|
| 5,600,070 | A * | 2/1997 | Wlodarczyk | 73/715 |
| 5,657,405 | A * | 8/1997 | Fujiwara | 385/12 |
| 5,771,091 | A * | 6/1998 | Paritsky et al. | 356/4.01 |
| 6,131,465 | A * | 10/2000 | Wlodarczyk et al. | 73/715 |
| 6,239,865 | B1 * | 5/2001 | Paritsky et al. | 356/4.07 |
| 6,462,808 | B2 * | 10/2002 | Paritsky et al. | 356/4.01 |
| 6,618,124 | B2 * | 9/2003 | Paritsky et al. | 356/4.07 |
| 6,622,549 | B1 * | 9/2003 | Wlodarczyk et al. | 73/114.51 |
| 6,651,481 | B1 * | 11/2003 | Youngquist | 73/1.64 |
| 6,820,488 | B2 * | 11/2004 | Lenzing et al. | 73/705 |
| 7,340,118 | B2 * | 3/2008 | Wlodarczyk et al. | 385/12 |
| 7,603,009 | B2 * | 10/2009 | Ramos | 385/47 |
| 2006/0170909 | A1 * | 8/2006 | Wlodarczyk et al. | 356/225 |

FOREIGN PATENT DOCUMENTS

| | | |
|---|---|---|
| EP | 0985911 | 3/2000 |
| GB | 2186360 | 8/1987 |

OTHER PUBLICATIONS

English translation of International Preliminary Examination Report on Patentability, issued Jun. 10, 2009.

* cited by examiner

*Primary Examiner* — Freddie Kirkland, III
(74) *Attorney, Agent, or Firm* — Dority & Manning, P.A.

(57) ABSTRACT

The invention relates to an optical pressure sensor based on light intensity measurements and comprises at least one membrane and two parallel optical fibers. At least one first fiber has a fiber end and a light emission surface for emitting light in the direction of the membrane. At least one second fiber has a fiber end having a light admission surface for receiving the light reflected from the membrane and transmitting that reflected light. The light emission surface and the light admission surface of the two fibers are disposed facing away from each other. This changes the optical path of the light during use such that the light portion received by the at least one second fiber is very sensitive to the position of the membrane.

17 Claims, 2 Drawing Sheets

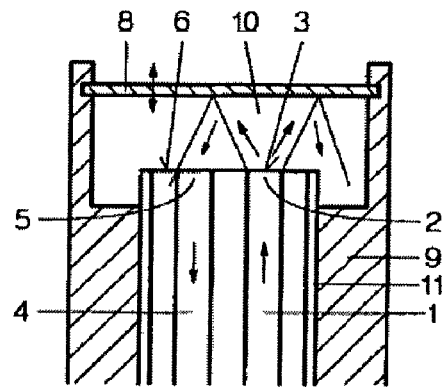
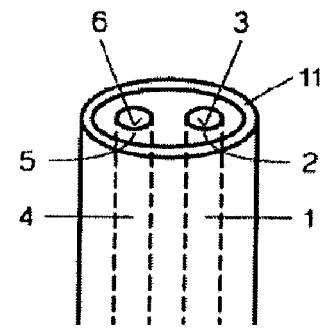
Fig.1a  Fig.1b
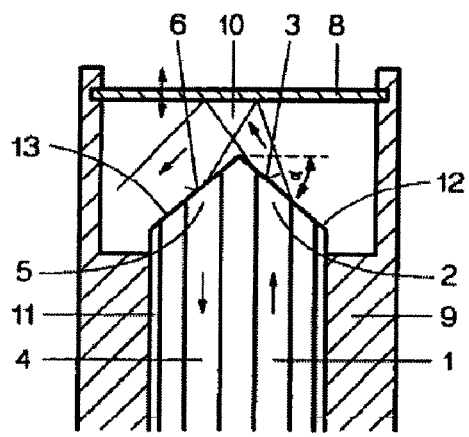
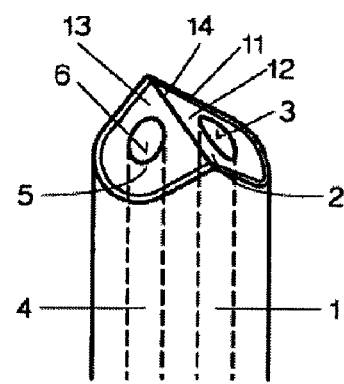
Fig.2a  Fig.2b
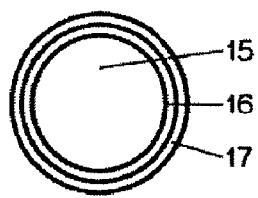
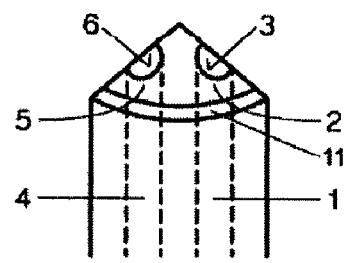
Fig.3  Fig.4 b)

US 8,074,501 B2

OPTICAL PRESSURE SENSOR HAVING AT LEAST TWO OPTICAL FIBERS

CROSS-REFERENCE TO RELATED APPLICATIONS

This application claims priority to International Application Ser. No. PCT/CH2007/000589 filed Nov. 26, 2007, which claims priority to Swiss Application No. CH/01914/06 filed Nov. 27, 2006.

TECHNICAL FIELD

The invention relates to an optical pressure sensor based on light intensity measurements comprising at least one membrane as well as at least a first optical fiber and a light emission surface and at least a second optical fiber arranged in parallel to the first optical fiber and a light admission surface wherein a light beam is guided from the first fiber via the light emission surface to the membrane where it can be reflected and wherein the reflected light beam can enter via the light admission surface into the second fiber in which it can be further transmitted.

BACKGROUND

Optical sensors of this type are, for example, employed for engine pressure measurements and are e.g. built into standard spark plugs for this purpose. Other types are used in miniaturized nozzle pressure sensors, for example. In such sensors, light is emitted from a first fiber to a membrane. This membrane is located at a variable position, i.e. closer to or farther away from the emitting fiber, depending on the amount of pressure that acts thereonto from the other side. Then, the light is reflected at the membrane. A portion of the reflected light impinges onto the second fiber that guides the light to a measuring device in which this light intensity of the light is measured. Eventually, the position of the membrane with respect to the optical fibers and, thus, the pressure prevailing at the membrane at that time of measurement can be deduced from the light intensity measured.

It is a disadvantage of such systems that a small signal is superposed on a huge offset. Therefore, the smallest disturbances of this offset result in dramatic errors in the pressure signal measured.

OBJECTS AND SUMMARY OF THE INVENTION

It is an object of the present invention to suggest an optical pressure sensor of the type described in the beginning which is insensitive to load change drift, thermal shock and drift.

To be able to incorporate sensors for example in standard spark plugs requires a small diameter. Thus, the required miniaturization of the total sensor diameter of <2 mm and before long of <1.5 mm or even <1 mm, poses a permanent challenge.

The object has been achieved by the characterizing parts of the independent claim.

The idea underlying the present invention is that the light emission surface and the light admission surface are disposed facing away from each other. The optical path of the light is altered so that in use the portion of light that is received by the receiving fiber 4 greatly depends on the membrane position.

Furthermore, due to the favorable optical path the membrane can be disposed close to the fiber ends so that a major proportion of the light intensity can be utilized. In this way, the dynamics with respect to disturbances is enhanced. In addition, the variance in light intensity is proportional to the pressure applied.

The easiest way to accomplish the invention is by means of a roof-like edge of a ferrule that incorporates these two fibers wherein the light emission surface and the light admission surface each are arranged on one side of the roof-like edge.

BRIEF DESCRIPTION OF THE DRAWINGS

In the following the invention will be explained in more detail with respect of the drawings which show FIG. 1a a schematic representation in cross-section of an optical sensor according to the prior art in the region of the sensor head;

FIG. 1b a schematic perspective representation of an optical sensor according to the prior art in the region of the fiber ends of the light guide;

FIG. 2a a schematic cut-open view of an optical sensor according to the invention in the region of the sensor head;

FIG. 2b a schematic perspective representation of an optical sensor according to the invention in the region of the fiber ends of the light guides;

FIG. 3 a schematic representation in cross-section of a fiber;

FIG. 4 a perspective view of an alternative embodiment of a sensor according to the invention in the region of the fiber ends;

FIG. 6a-d perspective views of alternative embodiments of light emission and light admission surfaces having different shapes;

DETAILED DESCRIPTION OF EXEMPLARY EMBODIMENTS

Figure 5:
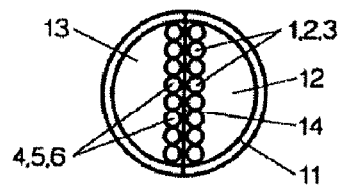
FIG. 5 a plan view of an alternative embodiment of a sensor according to the invention in the region of the fiber ends including a plurality of fibers.

The reference numerals were kept the same in all drawings.

FIG. 1a shows a schematic representation in cross-section of an optical sensor according to the prior art in the region of the sensor head. Within a ferrule 11 are represented a first light-conducting fiber 1 as well as a second light-conducting fiber 4 arranged in parallel to the first fiber 1 and having a fiber end 5. In operation, light 10 is emitted through the first fiber 1 at a light emitting surface 3 towards a membrane 8 where it is reflected. A portion of this light beam 10 eventually enters into a light admission surface 6 of the second fiber 4 and is transmitted for evaluation of the light intensity. The membrane 8 as well as the ferrule 11 enclosing the two light-conducting fibers 1, 4 are kept in a predetermined position by a housing 9. Depending on the amount of pressure acting from outside of the housing 9 onto the membrane 8, the membrane 8 will be displaced closer to the fiber ends 2, 5 of the fibers 1, 4. This changes the proportion of light 10 which was originally emitted through the first fiber 1 and which enters into the second fiber 4. The pressure prevailing at this time can be deduced from the light intensity transmitted through fiber 4 since the light intensity impinging onto the first fiber 1 is known.

FIG. 1b shows the end of the ferrule 11 with the two fiber ends 2, 5, the light emitting surface 3 of the first fiber 1 as well as the light admission surface 6 of the second fiber 4 according to the prior art in a perspective view. The end of the ferrule as a whole has a planar edge so that the light emission surface 3 and the light admission surface 6 both are disposed in one plane extending parallel to the membrane 8.

FIG. 2a shows the same arrangement as in FIG. 1a with the exception that the light admission surface 3 and the light emission surface 6 are arranged facing away from each other. In contrast to FIG. 1a they are not arranged in one plane that extends parallel to the membrane but in one which is inclined with respect to the membrane in an angle α. The emerging light beam 10 is refracted at the light emission surface 3 of fiber 1 towards the center of the ferrule 11 and is reflected at the membrane 8 towards the light admission surface 6. Because of the favorable entrance angle a light beam 10 reaching the light admission surface 6 is transmitted within the second fiber 4. It is crucial, however, that the quantity of light of the impinging light beam 10 strongly depends on the membrane position and changes in a manner proportional thereto.

The two surfaces 3 and 6 are facing away from each other if their inner surfaces are facing each other. Specifically, parallel surfaces are neither facing each other nor facing away from each other. FIGS. 2, 4, and 6 show various examples illustrating the expression "facing away from each other".

Due to the arrangement of the light emission surface 3 and the light admission surface 6 of the fiber ends 2, 5 the wanted signal is amplified with respect to the offset and the quality of the measurement is enhanced. The distance of the membrane 8 to the fiber ends 2, 5 as well as the angle α are optimized under several aspects. On the one hand, the refractive indices on both sides of the light emission surface 3 as well as the light admission surface 6 define the angle of total reflection limiting the angle of incidence and the angle of emergence. On the other hand, the difference in the light impinging onto the light admission surface that is caused by the variable membrane position should be as dynamic as possible. That means, that the intensity of the light 10 entering into the second fiber 4 varies as much as possible due to a change in the position of membrane 8.

FIG. 2b shows the end of the ferrule 11 with the two fiber ends 2, 5, the light emission surface 3 of the first fiber 1 as well as the light admission surface 6 of the second fiber 4 in a perspective view in an embodiment of the invention. In this embodiment, the end of the ferrule 11 has a root-like edge where each of the fiber ends 2, 5 terminates in a different roof plane. The fiber ends 2, 5 are arranged symmetrically with respect to a central plane 14 of the sensor. In this embodiment, this central plane 14 is represented by the ridge of the roof-like edge. Preferably, the fiber ends 2, 5 are disposed close to each other, if possible touching each other.

In another preferred embodiment the light emission surface 3 and the light admission surface 6 are disposed in two planes 12, 13. These planes 12, 13 define the two roof planes of the roof-like edge in FIG. 2b.

The angle α between the two planes of the roof-like edge and a plane which extends parallel to the membrane 8 should be as steep as possible, however, without leading to total reflection at the light emission surface 3 or the light admission surface 6. Angles of between 20 and 40°, in particular between 25 and 35°, have been found to be particularly suitable.

Figure 8:
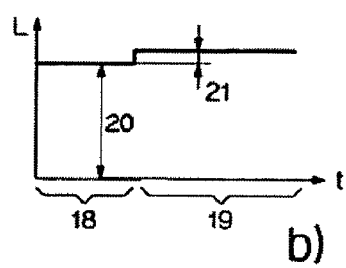
FIG. 8 a schematic time-dependent sensor signal obtained using a) a sensor according to the prior art, and b) a sensor according to the invention.
Figure 8:
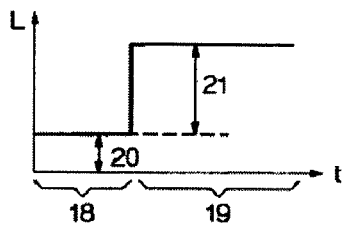

FIG. 8 schematically shows a time-dependent sensor signal, in the first portion 18 without any load and in the second portion 19 with full load wherein in a) a prior art sensor according to FIG. 1 and in b) a sensor according to the invention, for example according to FIG. 2, was used. The first portion 18 shows an offset signal 20, the second portion 19 a wanted signal 21 that is superposed on the offset signal.

It can be seen that in the arrangement according to the invention the ratio of wanted signal to offset signal was improved by multiple orders of magnitude compared to the arrangement according to the prior art. In this way, the sensor according to the invention has been strongly improved with respect to load change drift, thermal shock and drift.

FIG. 3 represents a light-conducting fiber in cross-section. The fiber is composed of a light-conducting core 15 surrounded by a cladding 16. This cladding 16 is itself enclosed by a protective layer 17. In the embodiment of the invention a fiber with a core 15 that encompasses at least 40% of the total area or 60% of the total diameter of the fiber should be used.

For clarity, the other Figures aside from FIG. 3 each only show the core 15 of a fiber 1, 4 without cladding and protective layer. In the representations, the fibers 1, 4 that touch each other therefore have always a distance of twice the cladding thickness including the protective layer.

The fibers 1, 4 are led in parallel whereby their handling and processing is simplified and miniaturization of the sensor is enabled. In a preferable embodiment as for example represented in FIG. 2b the fibers 1, 4 are conducted within a ferrule 11 which, however, is not obligatory for carrying out the invention. In addition, also the symmetrical arrangement of the light emission surface 3 and the light admission surface 6 within the sensor is not mandatory but simplifies mounting and evaluation.

An alternative embodiment with regard to FIG. 2b is shown in FIG. 4. In this embodiment the ferrule 11 has a cone-shaped tip similar to a pencil with two leads arranged side by side representing the fibers 1, 4.

Another alternative embodiment is shown in FIG. 5 as a plan view onto a ferrule 11 containing the fiber ends 2, 5. In this embodiment several or a plurality of first and second fibers 1, 4 are represented wherein in operation the first fibers 1 are the emitting fibers and the second fibers 4 are the receiving fibers. These fibers 1, 4 are arranged on both sides of the central plane 14. All advantageous embodiments as described for FIG. 2 apply analogously also to this arrangement with several first and second fibers 1, 4. Specifically, all light emitting surfaces 3 and all light admitting surfaces 6 each can be arranged in planes wherein preferably all light emitting surfaces 3 lie in a first plane 12 and all light admitting surfaces 6 lie in a second plane 13. Each of these first 1 and second fibers 4 can be arranged in an array, as depicted, on both sides of and close to the central plane 14, preferably touching each other. They can also be arranged in several arrays or in a random order on both sides of the central plane.

FIG. 6 represents further embodiments in a perspective view. The Figures illustrate different cut shapes wherein in each case—as shown—there can be arranged only one fiber per non-planar surface 12', 13' or, in a manner analogous to the representation in FIG. 5, several fibers per non-planar surface 12', 13'. The preferred arrangements and embodiments described above also apply here in an analogous manner.

Figure 6A:
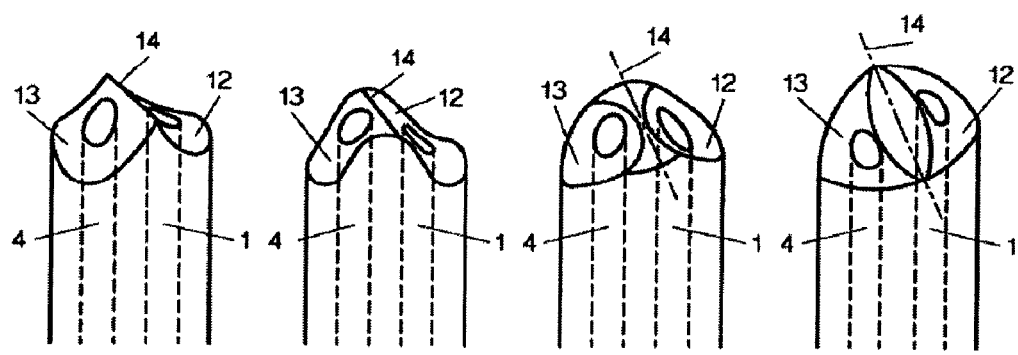

In these representations, FIG. 6a shows a concave cut and FIG. 6b an essentially convex cut in which the surfaces 3 and 6 are located. In FIGS. 6c and 6d the surfaces 3 and 6 are formed to represent concave (FIG. 6c) or convex (6d) segments of cylinders the axes of which intersect the central plane 14, or concave (FIG. 6c) or convex (6d) spherical segments, respectively.

All cuts described herein can be easily prepared if the fibers (1, 4) are held by the ferrule. Without an appropriate hold a sensor according to the invention would be difficult to fabricate, especially in the required miniaturized embodiment as described. Another advantage of the ferrule (11) is protection of the fiber ends in the case of strong vibrations as they occur in engines.

Figure 7:
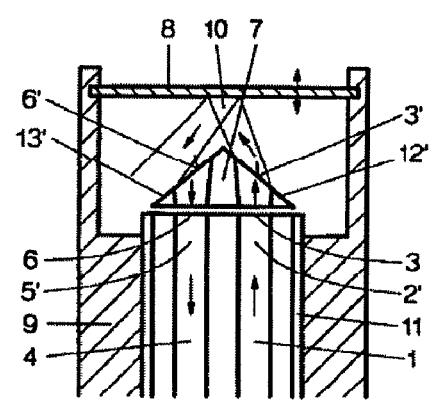
FIG. 7 a schematic cut-open representation of an alternative embodiment of an optical sensor according to the invention in the region of the sensor head.

FIG. 7 shows a schematic representation in a cut-open view of an alternative embodiment of an optical sensor according to the invention in the region of the sensor head. In contrast to FIG. 2a, in this embodiment the ends of the first fiber 1 and the second fiber 4 are located in the same plane parallel to the membrane 8. A light-conducting insert body 7 is arranged adjacent to these fiber ends 2', 5'. This insert body 7 has the same function as the fiber ends 2, 5 of the arrangement shown in FIG. 2a which are integrally connected to the two fibers 1, 4. In particular, the light emission surface 3' and the light admission surface 6' of the insert body are arranged facing away from each identically to the other arrangements described. Thus, the optical path in this alternative embodiment is essentially the same as in the arrangement depicted above and has the same advantages as described. The light path in the region of the insert body just is slightly conical because the reflecting lateral walls of a light guide are missing in the region of the insert body 7. All of the embodiments described herein above and in particular those depicted with regard to FIGS. 4-6 can be achieved accordingly by using an insert body 7 and the same advantages as illustrated above can be achieved.

LIST OF REFERENCE NUMERALS 1 first fiber
2 2' fiber end of a first fiber
3 3' light emission surface
4 second fiber
5 5' fiber end of a second fiber
6 6' light admission surface
7 light-conducting insert body
8 membrane
9 housing
10 light, light beam
11 ferrule
12 12' first plane
13 13' second plane
14 central plane
15 core
16 cladding
17 protective layer
18 first portion, without load
19 second portion, with full load
20 offset signal
21 wanted signal

The invention claimed is:

1. An optical pressure sensor based on light intensity measurements comprising at least one membrane as well as at least a first optical fiber and a light emission surface and at least one second optical fiber arranged in parallel to the first optical fiber and a light admission surface wherein a light beam is guided from the first fiber via the light emission surface to the membrane where it can be reflected and wherein the reflected light beam can enter via the light admission surface into the second fiber in which it can be further transmitted wherein the light emission surface and the light admission surface are disposed facing away from each other.

2. A sensor according to claim 1 wherein the light emission surface is a fiber end of the first fiber and/or the light admission surface is a fiber end of the second fiber.

3. A sensor according to claim 1 wherein between a fiber end of the first fiber and the light emission surface and/or between a fiber end of the second fiber and the light admission surface is disposed a light-conducting insert body.

4. A sensor according to claim 1, wherein the fibers are guided in a ferrule.

5. A sensor according to claim 1, wherein the light emission surface and the light admission surface are arranged symmetrically within the sensor.

6. A sensor according to claim 1, wherein it comprises several first fibers for emitting light and/or several second fibers for receiving light.

7. A sensor according to claim 6 wherein each fiber end of a first fiber is arranged mirror-symmetrically with respect to a central plane to a fiber end of a second fiber.

8. A sensor according to claim 1, wherein each light emission surface as well as each light admission surface is located in a plane.

9. A sensor according to claim 1, wherein all light emission surfaces are located in a first plane as well as all light admission surfaces are located in a second plane.

10. A sensor according to claim 1, wherein each fiber end of a first fiber is disposed close to a fiber end of a second fiber, preferably touching the same.

11. A sensor according to claim 1, wherein the light emission surface and the light admission surface form an angle of between 20° and 40° with respect to the membrane.

12. A sensor according to claim 11, wherein the light emission surface and the light admission surface form an angle of between 25° and 35° with respect to the membrane.

13. A sensor according to claim 1, wherein each optical fiber comprises a core, a cladding, and a protective layer wherein the area of the core comprises at least 40% of the area of the total fiber.

14. A sensor according to claim 1, wherein the sensor diameter is smaller than 2 mm.

15. A sensor according to claim 14, wherein the sensor diameter is smaller than 1.5 mm.

16. A method of measuring pressure comprising the steps of:
deploying a sensor in an engine, wherein the sensor includes at least one membrane as well as at least a first optical fiber and a light emission surface and at least one second optical fiber arranged in parallel to the first optical fiber and a light admission surface wherein a light beam is guided from the first fiber via the light emission surface to the membrane where it can be reflected and wherein the reflected light beam can enter via the light admission surface into the second fiber in which it can be further transmitted wherein the light emission surface and the light admission surface are disposed facing away from each other; and
disposing the membrane for engine pressure measurements.

17. A method of measuring pressure comprising the steps of:
deploying a sensor in a spark plug, wherein the sensor includes at least one membrane as well as at least a first optical fiber and a light emission surface and at least one second optical fiber arranged in parallel to the first optical fiber and a light admission surface wherein a light beam is guided from the first fiber via the light emission surface to the membrane where it can be reflected and wherein the reflected light beam can enter via the light admission surface into the second fiber in which it can be further transmitted wherein the light emission surface and the light admission surface are disposed facing away from each other; and deploying the spark plug in an engine wherein the membrane is disposed for engine pressure measurements.

* * * * *